US009712866B2

(12) United States Patent
Lasser (10) Patent No.: US 9,712,866 B2
(45) Date of Patent: Jul. 18, 2017

(54) CANCELLING TV AUDIO DISTURBANCE BY SET-TOP BOXES IN CONFERENCES

(71) Applicant: COMIGO LTD., Yarkona (IL)

(72) Inventor: Menahem Lasser, Kohav-Yair (IL)

(73) Assignee: COMIGO LTD., Yarkona (IL)

( * ) Notice: Subject to any disclaimer, the term of this patent is extended or adjusted under 35 U.S.C. 154(b) by 0 days.

(21) Appl. No.: 15/044,023

(22) Filed: Feb. 15, 2016

(65) Prior Publication Data

US 2016/0309119 A1    Oct. 20, 2016

Related U.S. Application Data

(60) Provisional application No. 62/148,354, filed on Apr. 16, 2015.

(51) Int. Cl.
| | | |
|---|---|---|
| *H04N 7/15* | (2006.01) |
| *H04N 21/439* | (2011.01) |
| *H04N 21/4788* | (2011.01) |
| *H04N 21/422* | (2011.01) |
| *H04N 7/14* | (2006.01) |

(52) U.S. Cl.
CPC .......... *H04N 21/439* (2013.01); *H04N 7/147* (2013.01); *H04N 21/42203* (2013.01); *H04N 21/4788* (2013.01)

(58) Field of Classification Search
CPC ............... H04N 7/147; H04N 7/17318; H04N 21/4126; H04N 21/4203; H04N 21/4204; H04N 21/439; H04N 21/4396; H04N 21/4788; H04N 21/47

USPC .......... 349/14.01–14.16; 725/110, 123, 131, 725/139, 151

See application file for complete search history.

(56) References Cited

U.S. PATENT DOCUMENTS

| | | |
|---|---|---|
| 5,305,307 A | 4/1994 | Chu |
| 5,661,813 A | 8/1997 | Shimauchi et al. |
| 5,706,344 A | 1/1998 | Finn |
| 5,761,318 A | 6/1998 | Shimauchi et al. |
| 5,796,819 A | 8/1998 | Romesburg |
| 5,933,495 A | 8/1999 | Oh |
| 5,937,060 A | 8/1999 | Oh |
| 6,246,760 B1 | 6/2001 | Makino et al. |
| 6,473,409 B1 | 10/2002 | Malvar |
| 6,553,122 B1 | 4/2003 | Shimauchi et al. |
| 6,556,682 B1 | 4/2003 | Gilloire et al. |
| 6,597,787 B1 | 7/2003 | Lindgren et al. |
| 6,694,020 B1 | 2/2004 | Benesty |
| 6,925,176 B2 | 8/2005 | Myllyla et al. |
| 6,928,161 B1 | 8/2005 | Graumann |
| 6,961,422 B2 | 11/2005 | Boland |
| 6,968,064 B1 | 11/2005 | Ning |

(Continued)

*Primary Examiner* — Melur Ramakrishnaiah
(74) *Attorney, Agent, or Firm* — Marc Van Dyke; Fourth Dimension IP (57) ABSTRACT

Embodiments of the present invention relate to a Set-Top Box (STB) that in addition to outputting a TV signal to an external TV set also supports conferencing between different users located at different locations. When a user is engaged in a conferencing session he may at the same time also view and listen to a TV program on the TV set. The STB of the present disclosure is able to cancel audio disturbances in the outgoing audio signal of the session that might be caused by the TV audio signal played by the TV speaker penetrating the session as a result of being received by the video conferencing microphone.

13 Claims, 6 Drawing Sheets

(56) References Cited

U.S. PATENT DOCUMENTS

| | | |
|---|---|---|
| 7,003,099 B1 | 2/2006 | Zhang et al. |
| 7,006,624 B1 | 2/2006 | Philipsson et al. |
| 7,035,398 B2 | 4/2006 | Matsuo |
| 7,039,197 B1 | 5/2006 | Venkatesh et al. |
| 7,046,794 B2 | 5/2006 | Piket et al. |
| 7,054,437 B2 | 5/2006 | Enzner |
| 7,062,040 B2 | 6/2006 | Faller |
| 7,099,458 B2 | 8/2006 | Piket et al. |
| 7,117,145 B1 | 10/2006 | Venkatesh et al. |
| 7,142,665 B2 | 11/2006 | Barron et al. |
| 7,171,003 B1 | 1/2007 | Venkatesh et al. |
| 7,426,270 B2 | 9/2008 | Alves et al. |
| 7,433,463 B2 | 10/2008 | Alves et al. |
| 7,464,029 B2 | 12/2008 | Visser et al. |
| 7,545,926 B2 | 6/2009 | Mao |
| 7,698,133 B2 | 4/2010 | Ichikawa |
| 7,747,001 B2 | 6/2010 | Kellermann et al. |
| 7,773,743 B2 | 8/2010 | Stokes et al. |
| 7,831,035 B2 | 11/2010 | Stokes et al. |
| 7,890,321 B2 | 2/2011 | Ichikawa |
| 8,064,966 B2 | 11/2011 | Herve et al. |
| 8,068,884 B2 | 11/2011 | Seydoux |
| 8,077,641 B2 | 12/2011 | Basu |
| 8,085,949 B2 | 12/2011 | Kim et al. |
| 8,111,833 B2 | 2/2012 | Seydoux |
| 8,150,027 B2 | 4/2012 | Guerin et al. |
| 8,175,871 B2 | 5/2012 | Wang et al. |
| 8,189,767 B2 | 5/2012 | Alves et al. |
| 8,194,850 B2 | 6/2012 | Liu et al. |
| 8,204,210 B2 | 6/2012 | van de Laar |
| 8,265,289 B2 | 9/2012 | Alves et al. |
| 8,275,142 B2 | 9/2012 | Liu et al. |
| 8,306,214 B2 | 11/2012 | Alves et al. |
| 8,320,554 B1 | 11/2012 | Chu |
| 8,325,910 B2 | 12/2012 | Kobayashi |
| 8,325,934 B2 | 12/2012 | Kuo |
| 8,345,860 B1 | 1/2013 | Kumar |
| 8,380,253 B2 | 2/2013 | Li et al. |
| 8,401,203 B2 | 3/2013 | Sudo et al. |
| 8,498,407 B2 | 7/2013 | Mohammad et al. |
| 8,600,038 B2 | 12/2013 | Mohammad et al. |
| 8,605,890 B2 | 12/2013 | Zhang et al. |
| 8,644,494 B2 | 2/2014 | Taniguchi et al. |
| 8,712,068 B2 | 4/2014 | Christoph |
| 8,774,398 B2 | 7/2014 | Abe et al. |
| 8,831,210 B2 | 9/2014 | Kumar |
| 8,838,184 B2 | 9/2014 | Burnett et al. |
| 8,934,622 B2 | 1/2015 | Chi et al. |
| 8,934,945 B2 | 1/2015 | Li et al. |
| 9,008,302 B2 | 4/2015 | Thapa et al. |
| 9,036,815 B2 | 5/2015 | Lee et al. |
| 9,053,697 B2 | 6/2015 | Park et al. |
| 9,071,900 B2 | 6/2015 | Vesa et al. |
| 9,088,336 B2 | 7/2015 | Mani et al. |
| 9,100,090 B2 | 8/2015 | Zhang et al. |
| 9,225,843 B2 | 12/2015 | Ikram |
| 2003/0005462 A1* | 1/2003 | Broadus .......... H04N 7/147 725/110 |
| 2006/0184624 A1* | 8/2006 | Thukral .......... H04N 7/15 709/204 |
| 2010/0272251 A1 | 10/2010 | Banba et al. |
| 2013/0003962 A1 | 1/2013 | Ballagas et al. |
| 2014/0223464 A1 | 8/2014 | Moran et al. |

\* cited by examiner

PRIOR ART

CANCELLING TV AUDIO DISTURBANCE BY SET-TOP BOXES IN CONFERENCES

CROSS-REFERENCE TO RELATED APPLICATIONS

This patent application claims the benefit of U.S. Provisional Patent Application No. 62/148,354 filed on Apr. 16, 2015, which is incorporated herein by reference in its entirety.

BACKGROUND

Reducing or Eliminating Echo Audio and Video Conferences

Audio conferences and video conferences became very popular in recent years. Starting as tools for business use, they had become available to private users and are widely employed for personal and social use.

One source of disturbance to the audio channel of a conference call (either an audio call or a video call) is the echoing of audio signals that are transmitted from the microphone of a first party in the call to the speaker of a second party, then to the microphone of the second party and finally back to the speaker of the first party. The problem and its prior art solutions are explained in the Wikipedia article entitled 'Echo Suppression and Cancellation" which begins as follows:

Echo suppression and echo cancellation are methods in telephony to improve voice quality by preventing echo from being created or removing it after it is already present. In addition to improving subjective quality, this process increases the capacity achieved through silence suppression by preventing echo from traveling across a network.

These methods are commonly called acoustic echo suppression (AES) and acoustic echo cancellation (AEC), and more rarely line echo cancellation (LEC). In some cases, these terms are more precise as there are various types and causes of echo with unique characteristics, including acoustic echo (sounds from a loudspeaker being reflected and recorded by a microphone, which can vary substantially over time) and line echo (electrical impulses caused by, e.g., coupling between the sending and receiving wires, impedance mismatches, electrical reflections, etc which varies much less than acoustic echo). In practice, however, the same techniques are used to treat all types of echo, so an acoustic echo canceller can cancel line echo as well as acoustic echo. "AEC" in particular is commonly used to refer to echo cancelers in general, regardless of whether they were intended for acoustic echo, line echo, or both.

Echo suppressors were developed in the 1950s in response to the first use of satellites for telecommunications, but they have since been largely supplanted by better performing echo cancellers.

Although echo suppressors and echo cancellers have similar goals preventing a speaking individual from hearing an echo of their own voice the methods they use are different:

Echo suppressors work by detecting a voice signal going in one direction on a circuit, and then inserting a great deal of loss in the other direction. Usually the echo suppressor at the far-end of the circuit adds this loss when it detects voice coming from the near-end of the circuit. This added loss prevents the speaker from hearing his own voice.

Echo cancellation involves first recognizing the originally transmitted signal that re-appears, with some delay, in the transmitted or received signal. Once the echo is recognized, it can be removed by subtracting it from the transmitted or received signal. This technique is generally implemented digitally using a digital signal processor or software, although it can be implemented in analog circuits as well.

ITU standards G.168 and P.340 describe requirements and tests for echo cancellers in digital and PSTN applications, respectively.

Figure 1:
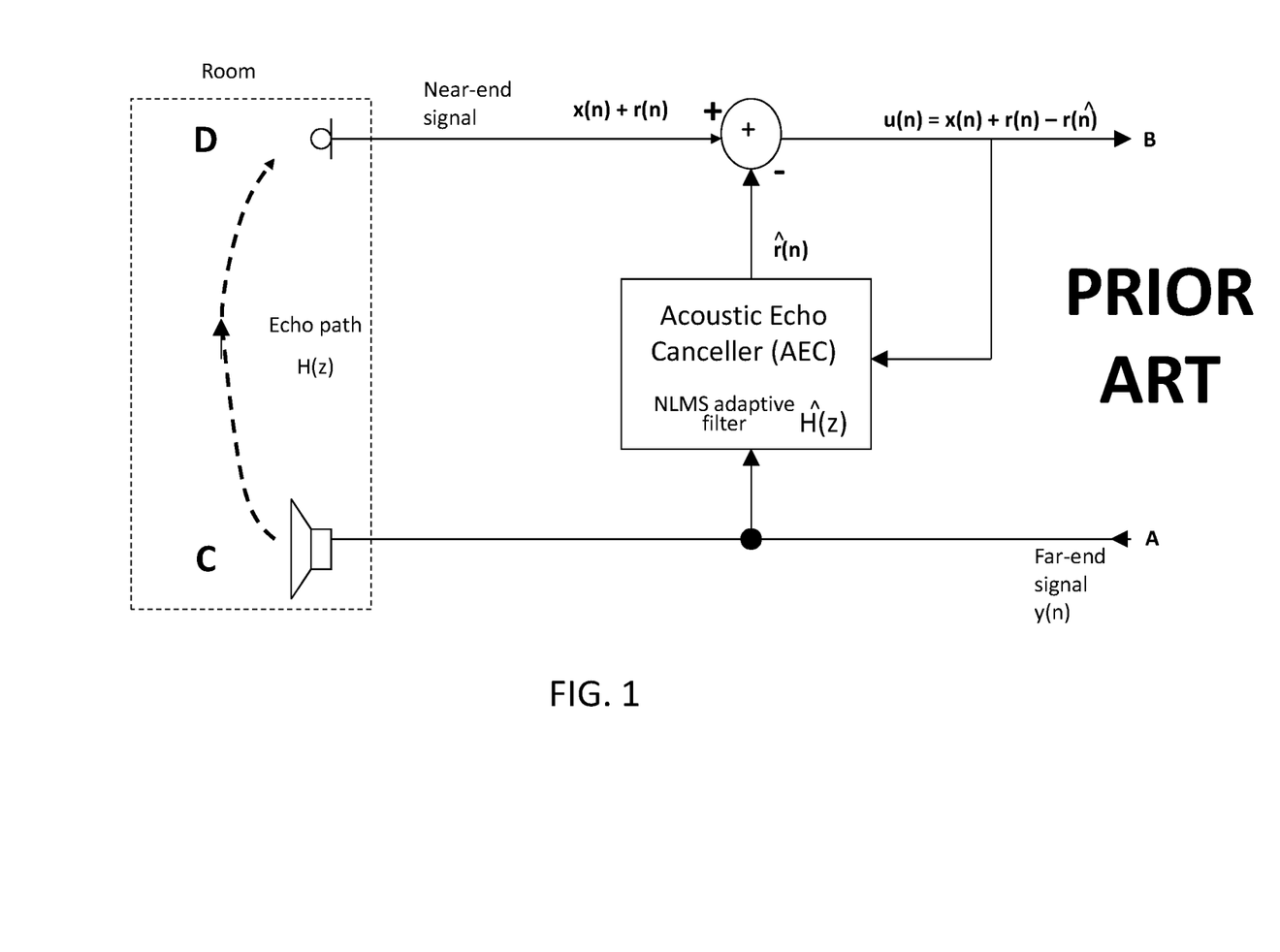
FIG. 1 (PRIOR ART) illustrates an acoustic echo canceller (AEC).

Acoustic echo cancellers are well known in the art. A block diagram of a typical prior art acoustic echo canceller is shown in FIG. 1 below (which is taken from the 1996 publication *Acoustic Echo Cancellation. Algorithms and Implementation on the TMS320C8x*. David Qi. Digital Signal Processing Solutions. SPRA063. May 1996 (hereinafter 'the Qi publication'), which is incorporated herein by reference in its entirety).

In FIG. 1 (PRIOR ART), $x(n)$ is the desired signal we want to output to the far end (the near-end user voice) and $r(n)$ is the undesired signal (i.e. the disturbance entering the near-end microphone as a result of the near-end speaker playing the far-end signal $y(n)$) whose elimination is desired. The way AEC works is to use the far-end incoming signal as a reference input to an adaptive filter, based on which the outgoing near-end signal is filtered by subtracting the echo. This way the far-end user does not hear his voice coming back as an echo. In the example of FIG. 1, the AEC includes a Normalized Least Mean Squares (NLMS) adaptive filter.

This implies that undesirable signals for which there is no available reference cannot be filtered out and will reach the far-end user. Any signal that is generated at the near end but (unlike the near-end user's voice) should not be heard on the other side of the call is an undesirable signal. An example for an undesirable signal is a radio playing in the background of the near-end user which we do not want to be heard on the far-end side. However, as explained above, the current AEC solutions are not effective in eliminating such signals from being sent out.

The problem of undesired background signals is typically dealt with by trying to avoid generating them in the first place. A person in the same room as the user that speaks loudly is quickly being hushed, a radio or music player in the room is being turned off or turned down to a low volume level, and if the source of the undesired signal cannot be turned off it may be physically moved away from the microphone to reduce the disturbance it causes.

Conventional techniques for AES or AEC are disclosed in some or all of the following 72 US patent documents, all of which are incorporated herein by reference: U.S. Pat. No. 5,305,307, U.S. Pat. No. 5,661,813, U.S. Pat. No. 5,706,344, U.S. Pat. No. 5,761,318, U.S. Pat. No. 5,796,819 U.S. Pat. No. 5,933,495, U.S. Pat. No. 5,937,060, U.S. Pat. No. 6,246,760, U.S. Pat. No. 6,473,409 U.S. Pat. No. 6,553,122, U.S. Pat. No. 6,556,682, U.S. Pat. No. 6,597,787, U.S. Pat. No. 6,694,020 U.S. Pat. No. 6,925,176, U.S. Pat. No. 6,928,161, U.S. Pat. No. 6,961,422, U.S. Pat. No. 6,968,064 U.S. Pat. No. 7,003,099, U.S. Pat. No. 7,006,624, U.S. Pat. No. 7,035,398, U.S. Pat. No. 7,039,197 U.S. Pat. No. 7,046,794, U.S. Pat. No. 7,054,437, U.S. Pat. No. 7,062,040, U.S. Pat. No. 7,099,458 U.S. Pat. No. 7,117,145, U.S. Pat. No. 7,142,665, U.S. Pat. No. 7,171,003, U.S. Pat. No. 7,426,270 U.S. Pat. No. 7,433,463, U.S. Pat. No. 7,464,029, U.S. Pat. No. 7,545,926, U.S. Pat. No. 7,698,133 U.S. Pat. No. 7,747,001, U.S. Pat. No. 7,773,743, U.S. Pat. No. 7,831,035, U.S. Pat. No. 7,890,321, U.S. Pat. No. 8,064,966, U.S. Pat. No. 8,068,884, U.S. Pat. No. 8,077,641, U.S. Pat. No. 8,085,949, U.S. Pat. No. 8,111,833, U.S. Pat. No. 8,150,027, U.S. Pat. No. 8,175,871, U.S. Pat. No. 8,189,767, U.S. Pat. No. 8,194,850, U.S. Pat. No. 8,204,210, U.S. Pat. No. 8,265,289, U.S. Pat. No. 8,275,142, U.S. Pat. No. 8,306,214, U.S. Pat. No. 8,320,554, U.S. Pat. No. 8,325,910, U.S. Pat. No. 8,325,934, U.S. Pat. No. 8,345,860, U.S. Pat. No. 8,380,253, U.S. Pat. No. 8,401,203, U.S. Pat. No. 8,498,407, U.S. Pat. No. 8,600,038, U.S. Pat. No. 8,605,890, U.S. Pat. No. 8,644,494, U.S. Pat. No. 8,712,068, U.S. Pat. No. 8,831,210, U.S. Pat. No. 8,838,184, U.S. Pat. No. 8,934,622, U.S. Pat. No. 8,934,945, U.S. Pat. No. 9,008,302, U.S. Pat. No. 9,036,815, U.S. Pat. No. 9,053,697, U.S. Pat. No. 9,071,900, U.S. Pat. No. 9,088,336, U.S. Pat. No. 9,100,090, and U.S. Pat. No. 9,225,843.

Set Top Boxes

A set-top box (STB) is an information appliance device that generally contains an input module for receiving data corresponding to video content from the external world and an output module for providing a TV signal to an external television set or to other display devices. The TV signal corresponds to the video content and is in a form that can be displayed on the television screen or on the other display devices. STBs may receive the data corresponding to the video content from cable networks, satellite networks, over-the-air television broadcasts or from digital networks such as the Internet. An STB may have additional functionalities that are not necessarily directed to displaying of video content. Examples are Internet browsing, conferencing, general-purpose computing, etc.

Figure 2A:
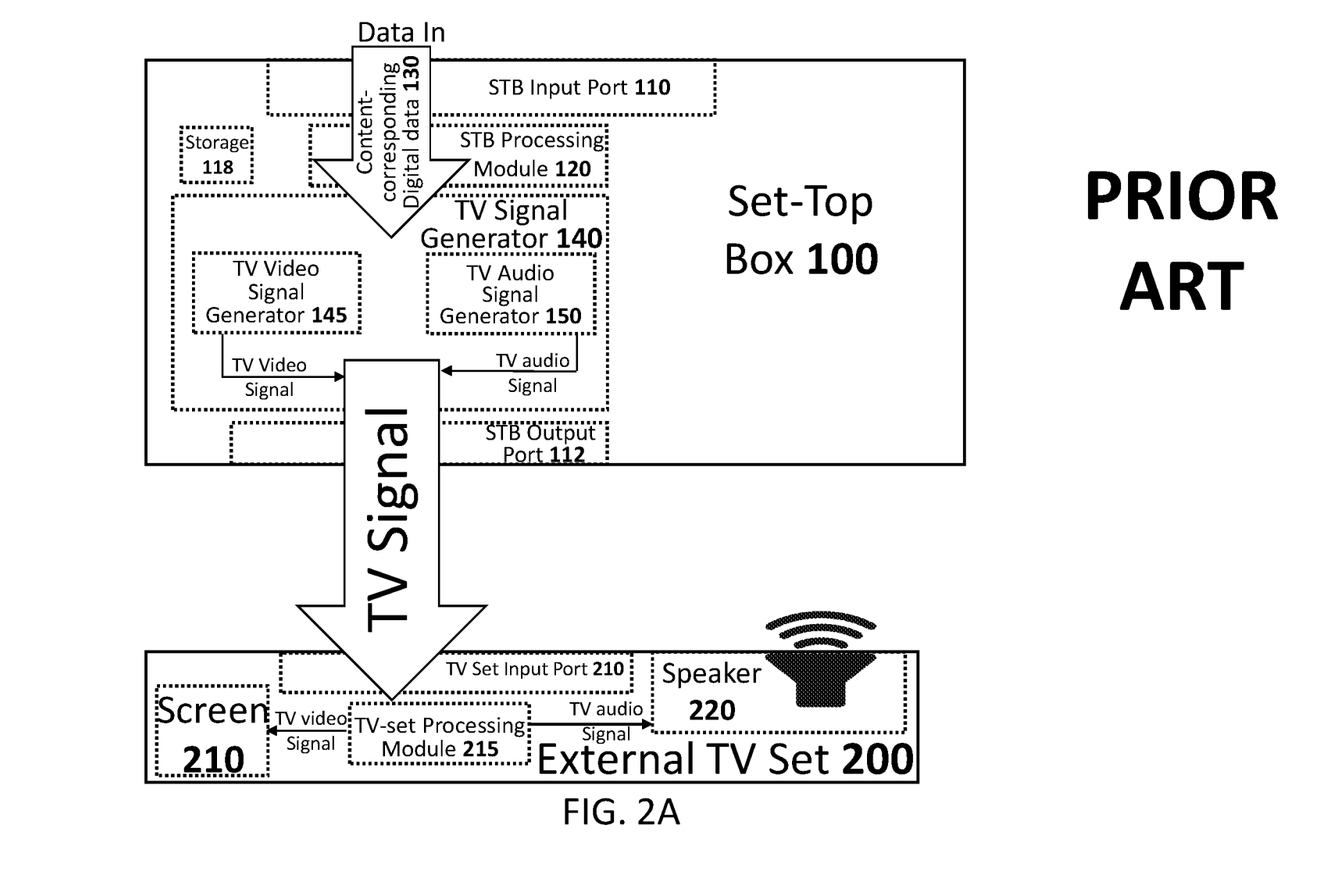
FIG. 2A (PRIOR ART) illustrates a set-top box in local communication with an external TV set.

FIG. 2A (prior art) describes a system comprising a conventional STB 100 in local communication with external TV set 200. For the present disclosure, when two devices are said to be in communication with each other, this term is intended to broadly cover the case of one-way communication (one example of which is illustrated in FIG. 2) or bidirectional communication.

In one example, STB 100 may be a IPTV (Internet Protocol television) TV STB or an OTT (over-the-top) TV—in these examples, packets of the digital content data are received into STB 100 from the cloud via input port 110. In another example, satellite receiver (NOT SHOWN) may receive the digital content data. In yet another example, a TV receiver (NOT SHOWN) may receive the digital content data as broadcast over-the-air. In all of these cases, digital content data 130 is said to be received into set-top box 100 via a device port(s) 110 which is defined broadly herein. In yet another example, data is locally uploaded to STB 100 via device port(s) 110, which may be or include a USB port. The incoming data may be handled and/or pre-processed by STB processing module 120 which, for example, may handle I/O-related operations.

For the present disclosure, any reference to a single 'port' may also refer to multiple ports and any reference to multiple ports may also refer to a single port. Thus, output port 112 via which the TV signal is output may refer to a single port for both video and audio or to a first port for video and a second (and separate) port for audio.

For the present disclosure, a 'TV signal' comprises two components (i) a TV video signal and (ii) a TV audio signal corresponding to an audio track of the TV signal.

For the present disclosure, when two ports are illustrated as separate ports they may in fact be separate or may be parts of a single port. Thus, in one example, even though input port 110 and output port 112 are illustrated separately, they may in fact be part of a common port.

For the present disclosure, unless stated otherwise, a 'port' may be wired or wireless. Thus, STB box 100 may be in wired and/or wireless communication with external TV set 200 via respective ports 112, 210.

Optionally, STB 100 includes non-volatile storage 118. In contrast to STB processing module 120 which may handle on-the-fly processing of incoming digital data, non-volatile storage 118 may be used for longer-term storage and may include, for example, flash memory or magnetic media or optical storage.

The digital content data may be encoded in any known format—example standards of formats for encoding and/or packaging digital content data 130 include but are not limited to H.264, H.265 (HEVC), AVI, all parts of MPEG4, MPEG2, any ISO-based media file format, Ogg, ASF, QuickTime, RealMedia, Matroska, and DivX.

Digital data 130 is made available to TV signal generator 140 which generates a TV signal from the digital data 130. Digital data 130 corresponds to content of the TV signal—e.g. a first portion of digital data 130 corresponds to the TV video signal and a second portion of digital data 130 corresponds to the TV audio signal.

In the particular example of FIG. 2A, TV signal generator 140 comprises: (i) TV video signal generator 145 for generating the TV video signal from digital data 130 (ii) TV audio signal generator 150 for generating the TV audio signal from digital data 130.

Optionally, 'generation' of a TV video signal and/or of a TV audio signal and/or of a TV signal includes decoding the digital data 130 corresponding to content of the TV signal. Towards this end, TV video signal generator 145 may include a video CODEC for decoding digital data 130 or a portion thereof—for example, a hardware video CODEC. In different examples, the video CODEC may comply with any known standard, including but not limited to H.264, H.265, WMV (Windows Media Video), On2 (e.g. VPx CODES), or any other standard.

Furthermore, digital data 130 is made available to TV audio signal generator 150 which generates a TV audio signal (i.e. audio stream) from the digital data 130. Optionally, this includes decoding audio of the digital data. TV audio signal generator 150 may include an audio CODEC for decoding digital data 130 or a portion thereof—for example, a hardware audio CODEC.

As shown in FIG. 2A, the TV signal is output to external TV set 200 via any appropriate analog and/or digital media port (e.g. plug or socket). Although FIG. 2A illustrates output of a single TV signal, this is not a limitation—alternatively, a first portion of the TV signal (e.g. TV video signal) may be exported to external TV set 200 via a first media port (i.e. considered part of port 112) and a second portion of the TV signal (e.g. TV audio signal) may be exported to external TV set 200 via a second media port (i.e. considered part of port 112).

Exemplary media ports include but are not limited to HDMI (High Definition Multi-media interface) sockets, DVI (digital video interface) connectors, DisplayPort connectors, S-video plugs, VGA (Video Graphics Array) ports, audio sockets, and USB connectors. External television (TV) set 200 comprises a screen 210 for presenting the TV video signal and a speaker 220 for playing the TV audio signal.

Figure 2B:
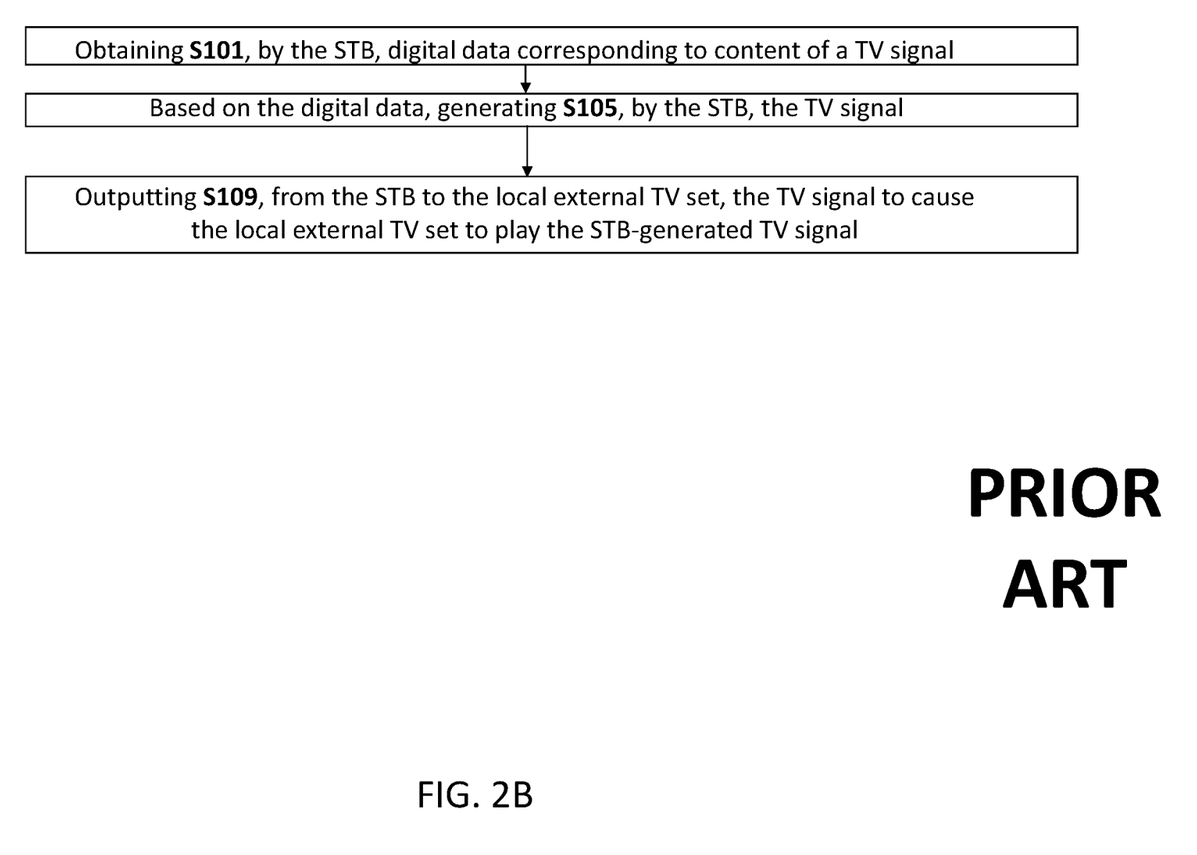
FIG. 2B (PRIOR ART) is a flow-chart of a method of operating the STB of FIG. 2A.

FIG. 2B is a Flow Chart Describing Operation of the System of FIG. 2A.

The method of FIG. 2B comprises: a. obtaining S101, by the STB 100, digital data 130 corresponding to content of a TV signal (e.g. via input port 110); b. based on the digital data 130, generating S105, by the STB 100 (e.g. by TV signal generator 140), the TV signal—i.e. the TV video signal (e.g. generated by TV video signal generator 145) and the TV audio signal (e.g. generated by TV audio signal generator 150); and c. outputting S109, from the STB 100 to the local external TV set 200, the TV signal to cause the local external TV set 200 to play the STB-generated TV signal (i.e. by presenting the TV video signal on screen 210 and causing speaker 220 to play TV audio signal).

Video Conferencing Concurrent with Television

Recently a new use of video conferencing became common, in which the conferencing (or "chatting" as it is sometimes called) takes place in parallel to joint watching of TV content by the participants of the conference. This is part of the trend of "social TV"—friends that sit in front of their respective TV screens at their respective homes and video-chat with each other while watching some TV content on the same screen on which the video chatting windows are presented. The watched content may be common to all participants in the session, but this is not necessarily so and there are use cases in which each user is watching a different channel and the users are updating each other on what they see. The participants may exchange comments about what they see on the screen, laugh or cheer at each other (for example when a goal is scored in a football match against or for one's favorite football team), or question each other about information related to a viewed program. The social TV experience is typically supported by an STB that provides the TV content to the TV screen, and has the ability to modify the signal going out to the TV screen such that the viewer sees additional information on top of the regular TV content provided by the TV operator. The additional information may be video windows showing images captured by local or remote cameras, text for user notifications, sound alerts, or any other type of information.

In such viewing scenarios a user wants to listen to both the audio track of the watched TV program and to the audio track of the conference at the same time. However, it is also desired that the TV audio track will not be transmitted out to the far end. If the TV audio does get to the far end the remote user will hear it twice with a small delay (in case both users are watching the same program) or will hear two different audio tracks garbled together (if the two users are watching different programs). The prior art solution of turning off or turning down the volume level of the TV is not applicable in such case because the near-end user needs it to be high enough to be conveniently heard by him.

SUMMARY OF EMBODIMENTS

Embodiments of the invention relate to a 'hybrid' Set-Top Box (STB) that in addition to providing conventional STB functionality (i.e. generating and outputting a TV signal to an external TV set) also supports 'remote' conferencing via the cloud with one or more remote peers. When a local user is engaged in a conferencing session with other user(s) at remote location(s), the user may at the same time also view and listen to a TV program on the TV set—the video of the TV program is generated by the hybrid STB and exported to an external TV set while the TV audio track of the TV program is also generated by the hybrid STB and played on a local speaker (e.g. a speaker of the external TV set).

In order to participate in the conference with remote user(s), the STB must output an audio signal to the remote peer(s). Towards this end, as is common in the art of conferencing, a local microphone senses desirable audio input such as the speaker's voice. Unfortunately, in the case of the hybrid STB, audio of the TV program is also sensed by the local microphone and must be filtered out.

Embodiments of the present invention relate to how the STB performs this filtering. In particular, it is now disclosed that the STB can take advantage of the fact that the TV audio track output by the TV speaker is available to the STB and can be used by the STB for removing the audio disturbances stemming from the sensing of the audio track output by the local microphone.

In one example, the TV audio track is available at the STB as it is encoded within the signal the STB is providing to the external TV set. If the displayed content is received in the STB from outside (i.e. from a TV operator), then the STB can decode the audio track from the content data it receives from the Internet (in case it is an IPTV STB or an OTT TV STB), from a satellite (in case it is a satellite TV STB), from a cable TV network (in case it is a cable TV STB) or from the air (in case it is a broadcast TV STB). If the STB plays previously-recorded content from a local storage device, the TV audio track can similarly be decoded from it. Alternatively, if the TV audio track is generated locally in the STB (for example music played while displaying a locally-generated menu) then it is available to the STB even without decoding it from TV content.

Once the TV audio track is available it is used as an input to an Acoustic Echo Cancellation (AEC) module such as the ones described in US patent documents cited in the background section and/or described in prior art FIG. 1 above. Strictly speaking, this is not an 'echo cancellation'—instead, techniques and algorithms borrowed from the field of echo cancellation (i.e. which are conventionally used to filter out undesired speaker disturbance—i.e, of the 'far-end' speaker) may be employed to perform the partial or complete filtering of the unwanted TV audio track from the microphone signal which includes a mixture of the TV audio track and the near-side speaker's voice. As is known in the art, the AEC module may be implemented in any combination of hardware and/or software.

Thus, in some embodiments, the audio TV signal replaces the far-end signal (y(n) in FIG. 1) as input to the AEC module. The skilled artisan will appreciate that the presently disclosed techniques may, in some embodiments, be used in combination with conventional echo-cancellation (e.g. of the far-end signal y(n)). For example, two AEC modules may be used—the first module may receive the far-end signal y(n) as input and the second module may receive the audio TV signal as input.

The adaptive filter of the AEC module is designed to reflect the transformations applied to the TV audio signal on its path through the TV speaker and the conferencing microphone, including effects caused by reflections from walls and other objects. This is not different from the case of an adaptive filter for a conventional AEC module (such as the one described in the Qi publication or any other AEC in the literature) and similar designs and implementations may be used. The skilled artisan will appreciate that echo cancellation techniques are well-known in the literature and have been described in US patent documents cited in the 'background' section of the present document—any prior art echo cancellation method may be employed.

As stated above, the input of the AEC is the audio TV signal. Output of the AEC is subtracted from the near-end microphone signal, which is composed from the chatting audio (e.g. the voice(s) of the near-side speaker(s)—the 'desirable' audio) and the TV audio (e.g. the 'undesirable' audio). The subtraction removes most or all of the TV audio from the near-end microphone signal and preferably leaves only the chatting signal to be sent out to the far end. With this solution none of the near-end TV audio signal (or at most a reduced intensity of the near-end TV audio signal) reaches the far end even if it is received by the near-end microphone, and consequently is not heard by the far-end user.

Note that other disturbances generated at the near end, such as another person talking, are not cancelled by the proposed 'filtering out of the near-end TV audio signal' as they are not correlated to the near-end TV audio signal (i.e. which is used as a reference signal fed to the adaptive filter) and therefore are not eliminated by the subtraction.

A method of operating a set-top box (STB) to at least partly cancel TV audio disturbance in a conferencing session is now disclosed, wherein: the STB (i) being in communication with a local external TV set that is the source of the TV audio disturbance and (ii) participating in the conferencing session where the STB outputs a conferencing audio signal to at least one remote peer.

The method comprises: a. obtaining, by the STB, digital data corresponding to content of a TV signal; b. based on the digital data, generating, by the STB, the TV signal; c. outputting, from the STB to the local external TV set, the TV signal to cause the local external TV set to play the STB-generated TV signal; d. based on the digital data, generating, by the STB, a TV audio signal corresponding to an audio track of the TV signal; e. receiving, by the STB, a microphone signal from a microphone; f. processing, by the STB, the microphone signal, the processing being performed: i. based on the TV audio signal; and ii. so as to generate a filtered microphone signal from which the TV audio signal is at least partly cancelled; and g. outputting, by the STB, the filtered microphone signal as the conferencing audio signal to the at least one remote peer.

In some embodiments, the generating of the TV signal by the STB comprises decoding the digital data to generate the TV signal therefrom.

In some embodiments, the digital data is decoded in real-time within the STB so that the TV signal is output to the local external TV set in real-time.

In some embodiments, the digital content is broadcast to the STB using a connectionless protocol.

In some embodiments, the STB receives the digital data via a first communications network and participates in the conferencing session via a second communications network that is different from the first communications network.

In some embodiments, the first communications network is a cable TV network and the second communications network is the Internet.

In some embodiments, the STB receives the digital data by a cable TV broadcast, or by an over-the-air television (OTA) broadcast or by a satellite TV broadcast.

In some embodiments, the STB receives the digital data using an Internet Protocol television (IPTV) or Over-The-Top (OTT) Internet protocol.

In some embodiments, the STB receives the digital data as part of a live television broadcast.

In some embodiments, the filtered microphone signal has a reduced level, compared to the microphone signal, of the disturbance caused by the external TV set playing the TV signal.

In some embodiments, the disturbance is absent from the filtered microphone signal.

In some embodiments, the processing is performed so that during at least some of the time in which the TV signal is being output to the TV set the TV audio signal is only partly canceled and is detectable within the filtered microphone signal.

In some embodiments, the processing employs a filtering function designed to compensate for delays and/or reflections affecting the TV audio signal on its way to the microphone.

In some embodiments, the local outputting of TV signal from the STB to an external TV, is performed wirelessly.

In some embodiments, the local outputting of TV signal from the STB to an external TV, is performed via a wired connection.

In some embodiments, the wired-connection outputting is performed via at least one of the following media ports: HDMI (High Definition Multi-media interface) connectors, DVI (digital video interface) connectors, DisplayPort connectors, S-video plugs, VGA (Video Graphics Array) ports, audio sockets, and USB connectors.

In some embodiments, the TV signal is converted within the STB from a digital signal to an analog signal before being outputted to the external TV set.

In some embodiments, the TV signal is output to the external TV set as a digital signal.

In some embodiments, the microphone is an onboard microphone of the STB that is embedded therein.

In some embodiments, the microphone is an external microphone that is external to the STB.

In some embodiments, the digital data corresponding to the content of the TV signal is obtained from a storage device accessible to the STB.

In some embodiments, the digital data corresponding to the content of the TV signal is obtained by generating it within the STB.

In some embodiments, (i) at least one of the at least one remote peer is a second STB in local communication with a second TV set that is external to the second STB such that the second STB outputs a second TV signal to the second TV set; and (ii) the TV signal and the second TV signal correspond to different TV channels.

In some embodiments, (i) at least one of the at least one remote peer is a second STB in local communication with a second TV set that is external to the second STB such that the second STB outputs a second TV signal to the second TV set; and (ii) the TV signal and the second TV signal correspond to a same TV channel.

In some embodiments, the conferencing session is a purely audio conferencing session.

In some embodiments, the conferencing session is a hybrid audio-video conferencing session.

Although the presently-disclosed teachings apply both to video conferencing and to audio conferencing, for simplicity the text sometimes refers only to one of them.

A set-top box (STB) for both converting digital data into a TV signal for an external TV set and for participating in a conferencing session where the STB outputs a conferencing audio signal to at least one remote peer, the STB comprising: a. an input port for receiving digital data corresponding to content of a TV signal; b. an output port for exporting the TV signal to the external TV set; and c. signal processing circuitry for: i. generating the TV signal based on the digital data; ii. outputting the TV signal from the STB to the external TV set via the output port, to cause the external TV set to play the STB-generated TV signal; iii. generating, based on the digital data, a TV audio signal corresponding to an audio track of the TV signal; iv. based on the TV audio signal, processing a microphone signal received from a microphone so as to generate a filtered microphone signal from which the TV audio signal is at least partly cancelled; and v. outputting the filtered microphone signal as the conferencing audio signal to the at least one remote peer.

In some embodiments, the input port and the output port are different ports.

Alternatively, the input port and the output port are a same port.

A method of operating a first set-top box (STB) and a second STB is disclosed. The method is performed to at least partly cancel multiple TV audio disturbances in a conferencing session, the first STB (i) being in communication with a first local external TV set that is the source of a first TV audio disturbance of the multiple audio disturbances and (ii) participating in the conferencing session with the second STB where the first STB outputs a first conferencing audio signal to the second STB, the second STB (i) being in communication with a second local external TV set that is the source of a second TV audio disturbance of the multiple audio disturbances and (ii) participating in the conferencing session where the second STB outputs a second conferencing audio signal to the first STB. The method comprises: a. obtaining, by the first STB, first digital data corresponding to content of a first TV signal; b. obtaining, by the second STB, second digital data corresponding to content of a second TV signal; c. based on the first digital data, generating, by the first STB, the first TV signal; d. based on the second digital data, generating, by the second STB, the second TV signal; e. outputting, from the first STB to the first local external TV set, the first TV signal to cause the first local external TV set to play the first TV signal; f. outputting, from the second STB to the second local external TV set, the second TV signal to cause the second local external TV set to play the second TV signal; g. based on the first digital data, generating, by the first STB, a first TV audio signal corresponding to an audio track of the first TV signal; h. based on the second digital data, generating, by the second STB, a second TV audio signal corresponding to an audio track of the second TV signal, the first and second digital data differing from each other so that the first and second TV audio signals differ from each other; i. receiving, by the first STB, a first microphone signal from a first microphone; j. receiving, by the second STB, a second microphone signal from a second microphone; k. processing, by the first STB, the first microphone signal, the processing being performed: (i) based on the first TV audio signal; and (ii) so as to generate a first filtered microphone signal from which the first TV audio signal is at least partly cancelled; l. processing, by the second STB, the second microphone signal, the processing being performed: (i) based on the second TV audio signal; and (ii) so as to generate a second filtered microphone signal from which the second TV audio signal is at least partly cancelled m. outputting, by the first STB, the first filtered microphone signal as the first conferencing audio signal to the second STB; and n. outputting, by the second STB, the second filtered microphone signal as the second conferencing audio signal to the first STB.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods and systems is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must"). In addition, no attempt is made to illustrate every element present in any given embodiment—the skilled artisan will appreciate that in any embodiment additional elements beyond those illustrated or described may be present.

Figure 3:
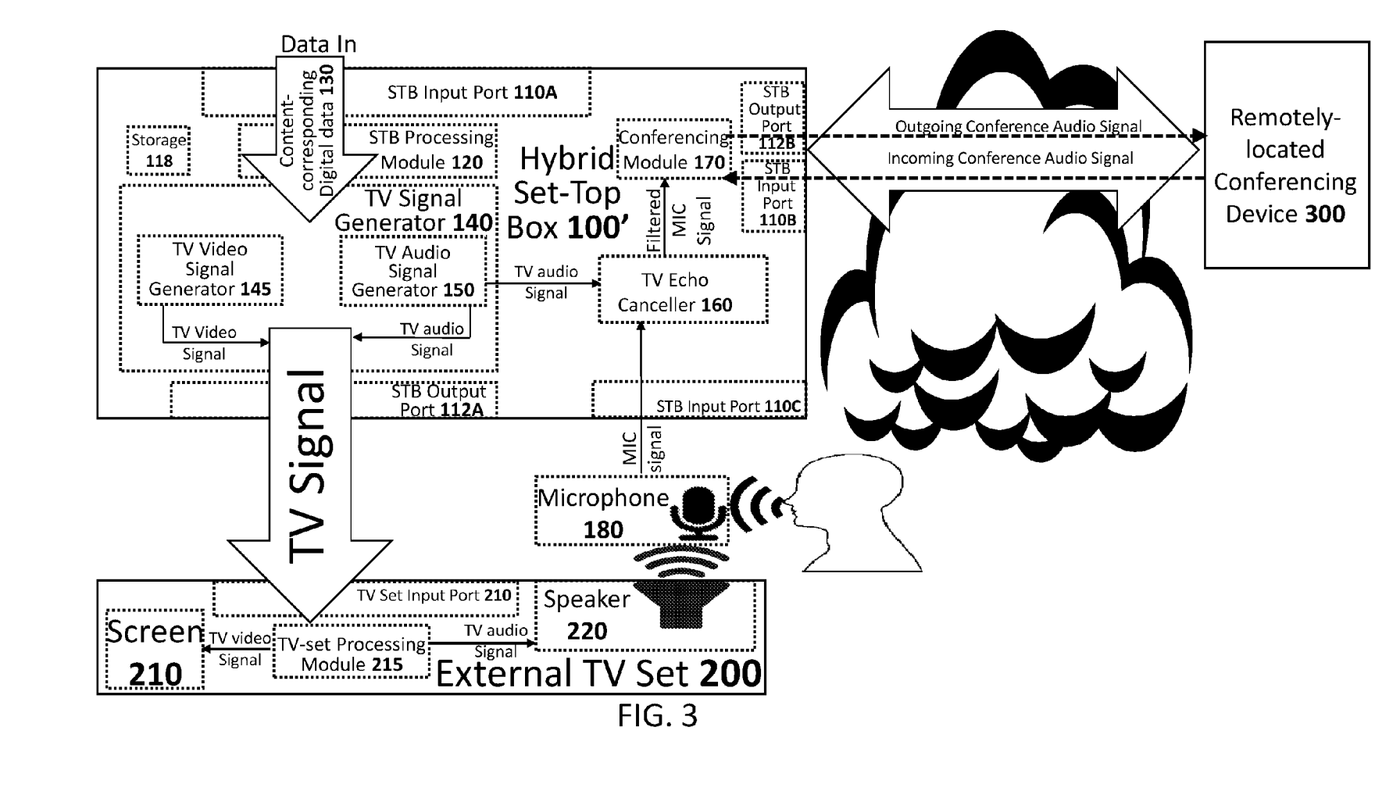
FIG. 3 illustrates a hybrid set-top box (STB) configured to at least partly cancel a TV audio disturbance in a conferencing session.
Figure 5:
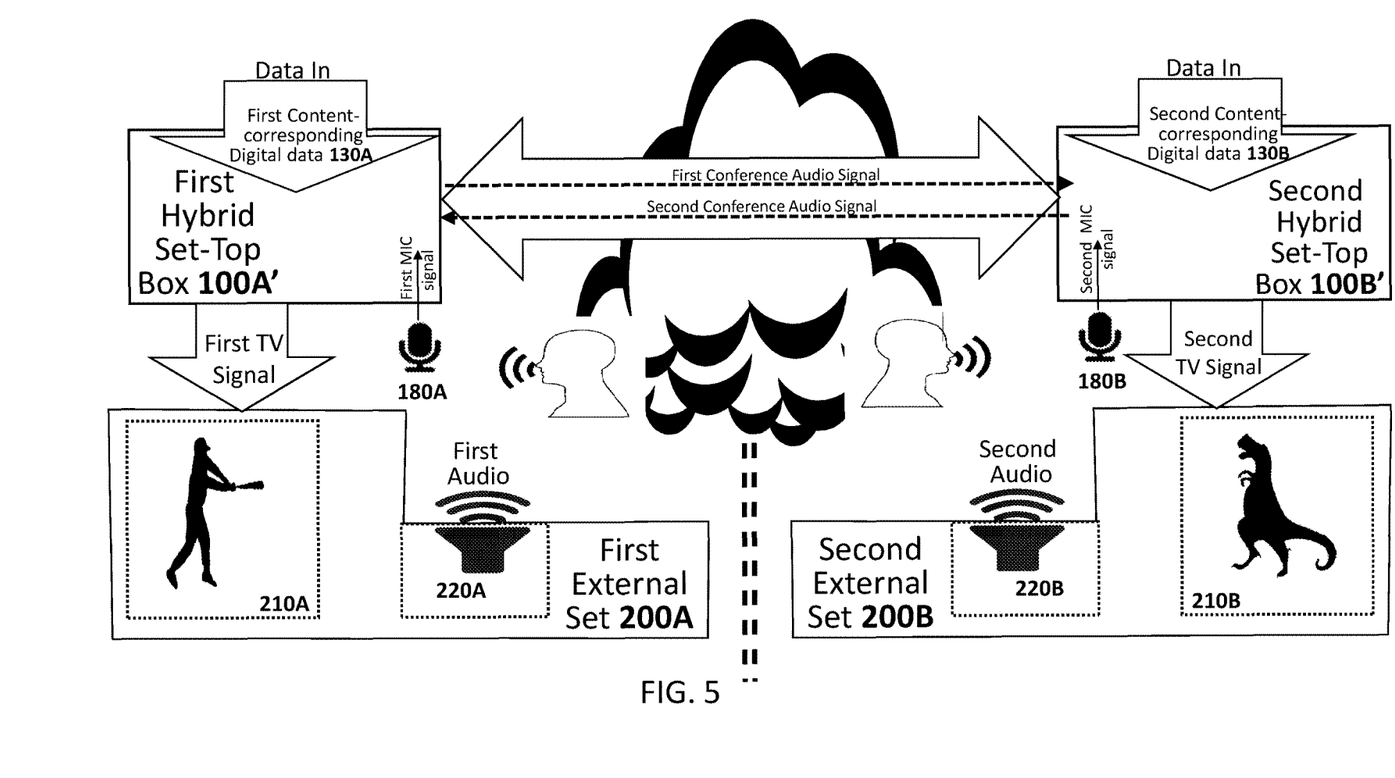
FIG. 5 illustrates first and second STBs in remote communication with each other for conferencing where each STB outputs a TV signal to an external TV set and each STB at least partially cancels an audio disturbance derived from the audio track of the corresponding TV signal.

FIGS. 3 and 5 illustrate systems including at least one hybrid set-top box (STB) 100' configured to at least partly cancel a TV audio disturbance in a conferencing session. The term 'hybrid' refers to the multiple functionality of the STB—it has conventional STB functionality as illustrated in FIG. 2 and in addition participates in a conferencing session with one or more remote peer(s) 300. Any element in the figures may be implemented in any combination of hardware and/or software. Furthermore, no attempt is made to illustrate all components.

The STB 100' of FIG. 3 may provide conventional STB functionality, for example, as described with reference to FIG. 2, where input port 110A is comparable to input port 110 of FIG. 2. Furthermore, STB 100' participates in a conferencing session with one or more remote peer(s) via output port 112B and input port 110B. The conferencing session requires audio—it may be a purely audio conferencing or may be a hybrid audio-video conferencing session (i.e. 'video conferencing'). In the context of the conferencing, a local microphone 180 which may be part of the hybrid set-top box 100' or may be a separate device receives audio input from one or more users who are speaking. A Conferencing module 170 of STB 100' outputs a conference audio signal to remotely-located conference device 300 (i.e. the 'peer') via a remote computing network (e.g. the cloud). Conferencing module 170 includes all elements required for achieving this purpose including, for example, elements for managing network I/O, voice over I/P software (and/or hardware), etc.

As is known in the art of remote computer conferencing over a network such as the Internet, conferencing module 170 must output an outgoing conference audio signal to each remote peer(s) 300, either directly or through a central conferencing server, and receive an incoming conferencing signal either from a single remote peer 300 or as an audio mixture of signals from multiple remote peer(s) provided by a central conferencing server. Although not illustrated in FIG. 3, conferencing module 170 sends the incoming conferencing audio signal to a speaker—i.e. either speaker 220 of external TV set 200 or to another speaker (NOT SHOWN).

Remotely-located conferencing device 300 (the 'remote peer') may or may not be a different hybrid set-top box 100'. In one example, remotely-located conferencing device 300 is a laptop computer or a tablet device or a mobile phone on which Skype® is executing.

The outgoing conferencing audio signal that is output by conferencing module 170 (e.g. via output port 112B) is derived from the MIC signal generated by local microphone 180 and received into hybrid set-top box 100' via input port 110C. However, as will be discussed below, the outgoing conferencing audio signal is not identical to the MIC signal.

Instead, the MIC signal is processed to filter out the TV audio signal. In particular, microphone signal 180 receives audio of voice(s) from the local user(s) who speak (i.e. 'desirable audio') and audio of the TV audio signal as output by speaker 220.

This audio of the TV audio signal, as received by microphone 180, is undesirable and it is necessary to filter it out from the MIC signal. Towards this end, as shown in FIG. 3, TV echo canceller 160 may include an AEC—e.g. similar to that the disclosed in the Qi publication or in any prior art patent document listed herein. For example, the TV audio signal (i.e. which takes the place of the far end signal y(n)) is fed to TV echo canceller 160 from TV audio signal generator 150 as a reference signal, identifying the undesired component existing in the MIC signal.

For example, TV echo canceller 160 processes the microphone signal according to the TV audio signal by subtracting from the microphone signal a filtered version of the TV audio signal. Other methods and algorithms of signal processing other than subtraction may also be used, as long as they result in removal or reduction of the existence of the TV audio signal in the output of TV echo canceller 160. The filtering of the TV audio signal is designed to correspond to delays and distortions suffered by the audio track of the TV signal from the time it enters speaker 220 until the time it is received by TV echo canceller 160.

Furthermore, STB 100' may include one or more additional echo canceller module(s) (NOT SHOWN) that are used for cancelling echoes coming from the far end of the conferencing session, as is known in the prior art. Thus, the filtered MIC signal is the MIC signal after being filtered by at least the AEC of illustrated TV Echo Canceller 160 and optionally by one or more additional AEC modules.

In the example of FIG. 3, the input of digital content data is illustrated generically—e.g. through an input port 110A that is separate from the input port 110B through which the incoming conference audio signal is received. This is not a requirement. In some embodiments (e.g. related to IPTV or OTT TV) two or more of input ports 110A, 110B and 110C are the same port In the example of FIG. 3, input port 110C is shown—e.g. microphone 180 may be an external microphone (but is not required to be)—this port 110C may be separate from the other input port(s) (i.e. as illustrated in FIG. 3) or it may be the same as the other input port(s).

Figure 4:
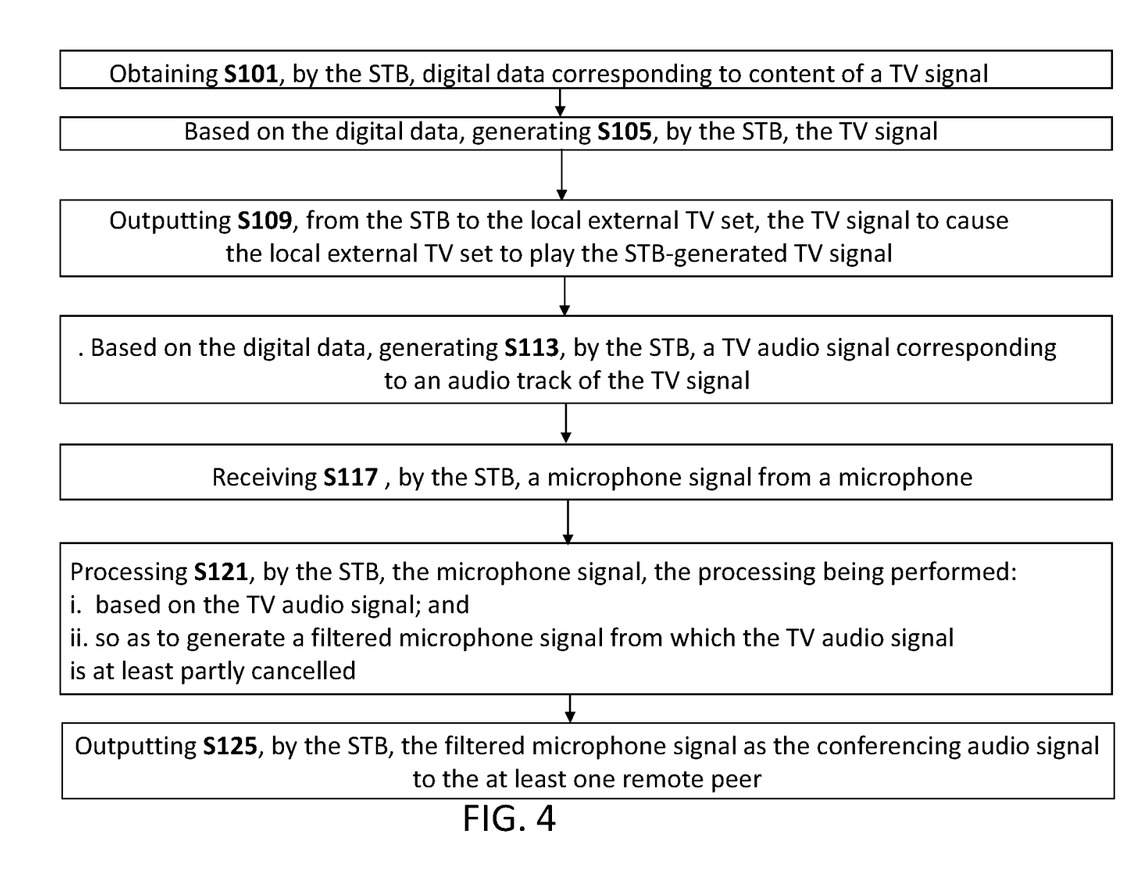
FIG. 4 is a flow-chart of a method of operating the STB of FIG. 3 so as to at least partly cancel a TV audio disturbance in a conferencing session.

FIG. 4 is a flow-chart of a method of operating the STB 100' so as to at least partly cancel a TV audio disturbance in a conferencing session. The STB 100' is (i) in communication with a local external TV set 200 that is the source of the TV audio disturbance (i.e. speaker 220 of the local external TV set is the source of the disturbance) and (ii) participates in the conferencing session where the STB outputs a conferencing audio signal to at least one remote peer 300.

Steps S101, S105 and S109 are as in step FIG. 2B and are described above. In step S113, the TV audio signal corresponding to an audio track of the TV signal is generated based on the digital data. In one particular non-limiting example, the 'generating' does not require converting again digital data 130 into the TV audio signal. Instead, in this particular example, the 'generating' of step S113 may be performed by using the TV audio signal generated in step S105 by TV Audio Signal Generator 150. In another non-limiting example, the 'generating' of step S113 is done independently of the generation of the TV audio signal in step S105, and may generate a different signal format than in step S105.

In step S117, the STB 100' receives a microphone signal (MIC signal) from a microphone 180—as noted elsewhere the microphone may be (i) an internal microphone, in which case the microphone signal may be received from within STB 100' or (ii) an external microphone.

In step S121, the STB 100' processes (e.g. by TV echo canceller 160), the microphone signal, the processing being performed: i. based on the TV audio signal (e.g. fed from TV audio signal generator 150 to TV echo canceller 160); and ii. so as to generate a filtered microphone signal from which the TV audio signal is at least partly cancelled.

In step S125, the STB 100' outputs (e.g. by conferencing module 170) the filtered microphone signal (i.e. optionally after further filtering of additional disturbances) as the conferencing audio signal to the at least one remote peer.

FIG. 5 illustrates first 100A' and second 100B' STBs in remote communication with each other for conferencing where each STB outputs a TV signal to a local TV set and each STB at least partially cancels an audio disturbance derived from the corresponding TV audio signal. For example, a first user operating first STB 100A' is watching a first television program (e.g. a baseball game) while a second user operating second STB 100B' is watching a second television program (e.g. a movie about dinosaurs). The different audio content is displayed by screen 210A of first external TV set 200A and by screen 210B of second external TV set 200B.

Clearly, the audio tracks of each TV program is different—i.e. the first audio output by speaker 220A is different from the second audio output by speaker 220B. Thus, the filtering performed by STB 100A' (i.e. the result of which is used to generate the first conference audio signal) is different from the filtering performed by STB 100B' (i.e. the result of which is used to generate the second conference audio signal).

Additional Discussion

Some embodiments relate to a method that is most useful in a Set-Top Box (STB) that outputs a TV signal to an external TV set and that at the same time also outputs a conferencing audio signal to one or more remote communication devices participating in a conference call with the STB. The method is for removing a disturbance in the conferencing audio signal caused by the external TV set playing the TV signal. The method comprises the following steps:

a. obtaining, by the STB, digital data corresponding to content of the TV signal;

b. based on the digital data, generating the TV signal by the STB;

c. outputting, by the STB, the TV signal to the external TV set, thus enabling the external TV set to play the TV signal;
d. based on the digital data, generating a TV audio signal corresponding to an audio track of the TV signal by the STB;
e. receiving, by the STB, a microphone signal from a microphone;
f. processing, by the STB, the microphone signal for generating a filtered microphone signal, where the processing is based on the TV audio signal; and
g. outputting, by the STB, the filtered microphone signal as the conferencing audio signal to at least one of the one or more remote communication devices.

That is, the STB uses the method for reducing a disturbance in its audio output to a conference it is taking part in, where the disturbance is caused by the TV set playing an audio track of a TV signal with the audio track being picked up by a microphone that serves the conference call for capturing the voice of a user participating in the conference call. The desired conferencing audio signal that we want to output to remote communication devices taking part in the conference call should preferably include only the voice of the user but not any signal picked up from the TV set speaker. The method reduces the disturbance by processing the microphone signal so as to subtract from it the contribution coming from the TV set. This is done by subtracting from the microphone signal some filtered function of the TV audio signal. The filtering function is designed so as to compensate for delays and reflections affecting the audio track of the TV signal on its way to the microphone, and is typically implemented as an adaptive filter.

For the present disclosure and for any embodiment disclosed herein, when the TV set is said to be external it is meant that the TV set is external to the STB in the sense that the STB and the TV set are packaged in two separate packages that may be connected by one or more cables or by a wireless communication channel.

For the present disclosure and for any embodiments disclosed herein, by a TV set it is meant any device that can display TV content on a screen embedded in it, regardless of any other functionality it may have. A TV set may contain only a screen and a speaker with no other functionality, or it may contain additional modules such as a receiver, a tuner, recording means, user-interface means of any kind or any other module.

Both the TV signal and the TV audio signal are generated within the STB based on digital data that corresponds to the content of the TV signal to be presented on the TV set. As such, there is no need for the STB to receive the TV audio signal from the external TV set, from another external receiver or from any other external device. Also, the external TV set receives the TV signal to display from the STB and does not need any other source for it.

In some embodiments, an additional step of playing the TV signal (e.g. using screen 210 and speaker 220) is performed by the external TV set.

In some embodiments related to any method or apparatus disclosed herein, the filtered microphone signal has a reduced level, compared to the microphone signal, of the disturbance caused by the external TV set playing the TV signal. That is, the filtered microphone signal has a lower level of presence of the disturbance than the level of presence of the disturbance in the microphone signal. It should be noted that even though the method reduces the level of the disturbance in the filtered microphone signal, it is not necessarily the case that the disturbance is completely eliminated. It is possible that the disturbance is still detectable, even if to a lesser extent, because of inaccuracies in modeling the TV set speaker output path to the microphone.

Alternatively, the disturbance may be completely removed from the filtered microphone signal to the extent it cannot be detected any more.

The digital data corresponding to the content of the TV signal may be obtained from a TV operator. The TV operator may be an IPTV operator, an OTT TV operator, a cable TV operator, a satellite TV operator or a broadcast TV operator.

Alternatively, the digital data corresponding to the content of the TV signal may be obtained from a storage device accessible to the STB.

Alternatively, the digital data corresponding to the content of the TV signal may be obtained by generating it within the STB.

The at least one remote communication device may be a second STB. This second STB may be outputting a second TV signal to a second external TV set. The second TV signal and the TV signal may correspond to different TV channels. Alternatively, the second TV signal and the TV signal may correspond to the same TV channel.

The TV audio signal may be an analog signal. That is, the STB may convert a digital representation of the TV audio signal it generates based on the digital data to an analog form before using it in the processing of the microphone signal. Alternatively, the TV audio signal may be a digital signal.

For the present disclosure or any embodiment described herein, the TV signal may be an analog signal. That is, the STB may convert a digital representation of the TV signal it generates based on the digital data to an analog form before outputting it to the external TV set. Alternatively, the TV signal may be a digital signal.

The microphone may be embedded in the STB. Alternatively, the microphone may be external to the STB.

The conferencing audio signal may be output to the at least one remote communication device as part of a conferencing session. This conferencing session may be a video conferencing session. Alternatively, this conferencing session may be an audio conferencing session.

The conferencing session may be between two participants. Alternatively, the conferencing session may be between more than two participants. The conferencing audio signal may be directly output to the at least one remote communication device. That is, the conferencing audio signal may be output from the STB directly to the at least one remote communication device, without passing through a conference server or a conference hub. Alternatively, the conferencing audio signal may be indirectly output to the at least one remote communication device. That is, the conferencing audio signal may be output from the STB to a conference server or a conference hub, and then sent from the server or the hub to the at least one remote communication device.

In some embodiments, presently-disclosed teachings may apply either to conferences using direct video/audio streaming between participants or to conferences using indirect video/audio streaming between participants (in which case every station transmits its video/audio stream to a central server which then distributes it to the other stations).

In an example related to a conference using direct mode, a station may separately send its output to each other station and make sure the TV audio is cancelled in all outputs, but because all outputs are identical in content one AEC module can serve them all. In an example related to a conference using indirect mode, a station sends out only one video/audio stream (that goes to the central server), and therefore there is no difference between a two-party conference and a three-party or four-party conference from the point of view of the near-end transmitting station.

In an alternate embodiment, the subtraction may be performed in the far end rather than in the near end. The far end STB obtains information regarding what TV channel the near end user is currently watching. Such ability is well known in the art, see for example US Patent Application 2014/0223464 incorporated herein by reference. The far-end STB can then get hold of the content viewed at the near end and decode the audio track from it. If both users are viewing the same TV channel then this is done exactly as in the previous embodiment, but even if they are viewing different TV channels the far-end STB can obtain the near-end TV channel content from its TV provider in addition and in parallel to the channel viewed at the far end. Once the audio track corresponding to the TV channel viewed at the near end is obtained in the far end, it is used in the far end as a reference signal input to an AEC module that is applied to the signal received from the near end. In this embodiment the TV audio does get into the audio conferencing network and reaches the far end, but is removed prior to reaching the far end speaker.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:
1. A method of operating a first set-top box (STB) to at least partly cancel a remotely-generated TV audio disturbance in a conferencing session, where (i) the first STB is participating in the conferencing session, (ii) as part of the conferencing session, the first STB receives an incoming conferencing audio signal from a remote STB, (iii) the remote STB exports a remote TV signal to a remote TV set that is local to the remote STB but remote to the first STB, (iv) a speaker of the remote TV set outputs remote soundwaves representing an audio track of the remote TV signal and (v) the remote soundwaves are received by a microphone that is local to the remote STB, thereby causing the incoming conferencing audio signal to contain the remotely-generated TV audio disturbance, the method of operating the first STB comprising:
   a. receiving, by the first STB and from the remote STB, the incoming conferencing audio signal which contains the remotely-generated TV audio disturbance;
   b. identifying, by the first STB, a remote TV channel that the remote TV set is playing;
   c. obtaining, by the first STB, digital data corresponding to content of the identified remote TV channel;
   d. based on the digital data, generating, by the first STB, a reference audio signal corresponding to an audio track of the identified remote TV channel;
   e. processing, by the first STB, the incoming conferencing audio signal, the processing being performed:
      i. based on the reference audio signal; and
      ii. so as to generate a filtered conferencing audio signal from which the remotely-generated TV audio disturbance is at least partly cancelled; and
   f. outputting, by the first STB, the filtered conferencing audio signal, so as to be played locally to the first STB.

2. The method of claim 1 wherein the first STB obtains the digital data via a first communications network and participates in the conferencing session via a second communications network that is different from the first communications network.

3. The method of claim 2 wherein the first communications network is a cable TV network and the second communications network is the Internet.

4. The method of claim 1, wherein the filtered conferencing audio signal has a reduced level, compared to the originally-received incoming conferencing audio signal received by the first STB from the remote STB, of the remotely-generated TV audio disturbance.

5. The method of claim 4, wherein the disturbance is absent from the filtered conferencing audio signal.

6. The method of claim 1, wherein the processing employs a filtering function designed to compensate for delays and/or reflections affecting the remote soundwaves on their way to the microphone.

7. The method of claim 1 wherein the conferencing session is a purely audio conferencing session.

8. The method of claim 1 wherein the conferencing session is a hybrid audio-video conferencing session.

9. A first set-top box (STB) for at least partly cancelling a remotely-generated TV audio disturbance in a conferencing session, where: (i) the first STB is participating in a conferencing session with a remote STB, (ii) as part of the conferencing session, the first STB receives an incoming conferencing audio signal from the remote STB, (iii) the remote STB exports a remote TV signal to a remote TV set that is local to the remote STB but remote to the first STB, (iv) a speaker of the remote TV set outputs remote soundwaves representing an audio track of the remote TV signal and (v) the remote soundwaves are received by a microphone that is local to the remote STB, thereby causing the incoming conferencing audio signal to contain the remotely-generated TV audio disturbance, the first STB comprising:
   a. TV-channel-identifying circuitry for identifying a remote TV channel that the remote TV set is playing;
   b. at least one input port for: (i) receiving digital data corresponding to content of the identified remote TV channel; and (ii) receiving from the remote STB the incoming conferencing audio signal which contains the remotely-generated TV audio disturbance;
   c. at least one output port; and
   d. signal processing circuitry for:
      i. generating, based on the digital data, a reference audio signal corresponding to an audio track of the remote TV-channel that has been identified by the TV-channel-identifying circuitry;
      ii. based on the reference audio signal, processing the incoming audio conferencing signal received from the remote STB so as to generate a filtered audio conferencing signal from which the remotely-generated TV audio disturbance is at least partly cancelled; and
      iii. outputting the filtered audio conferencing signal via the at least one output port so as to be played locally to the first STB.

10. A method of operating a first set-top box (STB) and a second STB to at least partly cancel multiple TV audio disturbances in a conferencing session, the first STB (i) being in local communication with a first local TV set that is the source of a first TV audio disturbance of the multiple audio disturbances and (ii) is participating in the conferencing session with the second STB where the first STB outputs a first conferencing audio signal, which contains the first TV audio disturbance, to the second STB, the second STB (i) being in local communication with a second local TV set that is the source of a second TV audio disturbance of the multiple audio disturbances and (ii) is participating in the conferencing session with the first STB, where the second STB outputs a second conferencing audio signal, which contains the second TV audio disturbance, to the first STB, the method comprising:
  a. receiving, by the first STB and from the second STB, the second conferencing audio signal which contains the second TV audio disturbance;
  b. identifying, by the first STB, a TV channel that the second local TV set is playing;
  c. obtaining, by the first STB, first digital data corresponding to content of the TV channel that the first STB has identified as being played by the second local TV set;
  d. receiving, by the second STB and from the first STB, the first conferencing audio signal which contains the first TV audio disturbance;
  e. identifying, by the second STB, a TV channel that the first local TV set is playing;
  f. obtaining, by the second STB, second digital data corresponding to content of the TV channel that the second STB has identified as being played by the first local TV set;
  g. based on the first digital data, generating, by the first STB, a first reference audio signal corresponding to an audio track of the TV channel that the second local TV set was identified to be playing;
  h. based on the second digital data, generating, by the second STB, a second reference audio signal corresponding to an audio track of the TV channel that the first local TV set was identified to be playing;
  i. processing, by the first STB, the second audio conferencing signal, the processing being performed:
    (i) based on the first reference audio signal; and
    (ii) so as to generate a second filtered conferencing audio signal from which the second TV audio disturbance is at least partly cancelled;
  j. processing, by the second STB, the first audio conferencing signal, the processing being performed:
    (i) based on the second reference audio signal; and
    (ii) so as to generate a first filtered conferencing audio signal from which the first TV audio disturbance is at least partly cancelled;
  k. outputting, by the first STB, the second filtered conferencing audio signal so as to be played locally to the first STB; and
  l. outputting, by the second STB, the first filtered conferencing audio signal so as to be played locally to the second STB.

11. The method of claim 10 wherein the first and second local TV sets are playing different TV channels so that the first and second digital data differ from each other.

12. The method of claim 1 further comprising exporting, by the first STB, a local TV signal to a local TV set that is local to the first STB, wherein the local TV signal corresponds to a different TV channel that is different from the remote TV channel.

13. The method of claim 1 further comprising exporting, by the first STB, a local TV signal to a local TV set that is local to the first STB, wherein the local TV signal corresponds to the remote TV channel.

* * * * *